April 12, 1932.   R. T. GLASCODINE ET AL   1,853,857
CENTRAL BUFFING AND DRAWGEAR FOR RAILWAY VEHICLES
Filed Nov. 29, 1929
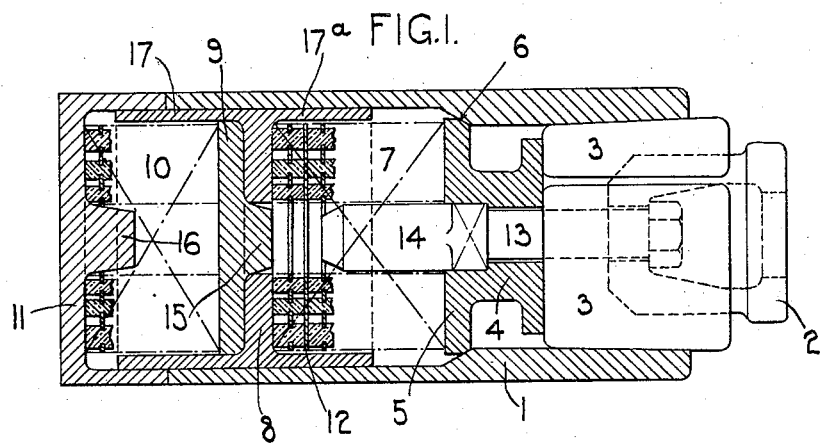
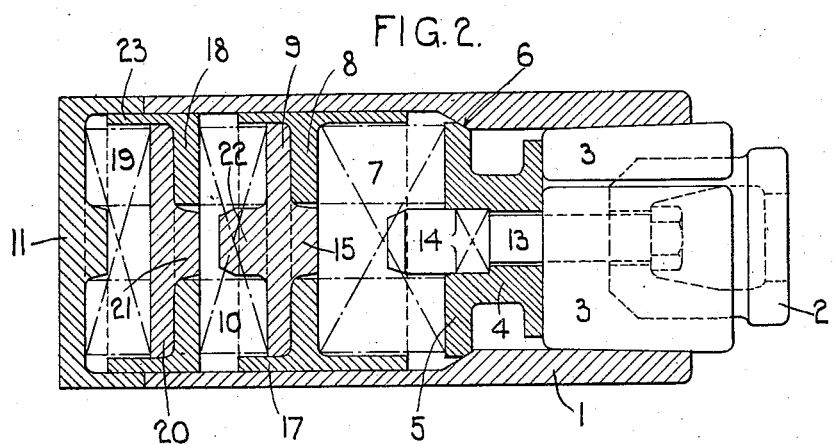
Inventors
Richard T. Glascodine
and Reginald L. Whitmore,
by Hubert W. Jenner,
Attorney.

Patented Apr. 12, 1932

1,853,857

UNITED STATES PATENT OFFICE

RICHARD THOMSON GLASCODINE AND REGINALD LAWRENCE WHITMORE, OF LONDON, ENGLAND

CENTRAL BUFFING AND DRAWGEAR FOR RAILWAY VEHICLES

Application filed November 29, 1929. Serial No. 410,557.

This invention relates to central buffing and draw gear for railway vehicles.

In a type of such gear in common use buffing and tension shocks are absorbed and dissipated by friction. The friction is produced by the forcing of wedge members between shoes or the like carried by a casing which is embraced by a yoke that is connected to the shank of the coupling head. A spring or nest of springs arranged within the casing are compressed when the wedge members are forced inwardly and the spring or nest of springs tends to maintain the wedge members in their advanced position. The said spring or nest of springs in the heretofore usual constructions of friction draw gear are helical steel springs.

The object of the present invention is to provide an improved construction of draw gear adapted to function in a more effective manner especially under heavy shock than is possible with the heretofore usual constructions of this type of gear.

For this purpose, according to the invention, a friction member arrangement of any known kind is used in combination with springs arranged tandem-wise within the casing that is embraced by the yoke of the coupling head shank, the said springs, which are preferably india-rubber springs, being so associated with abutment and compression plates as to be compressed by both draft and buffing stresses.

The accompanying drawings show the invention in combination with friction draw gear of a known type, but the invention is not restricted to friction gear of this type but is generally applicable for combination with any appropriate construction of friction draw gear.

Fig. 1 of the drawings is a central longitudinal section of one construction of apparatus embodying the invention.

Fig. 2 is a similar view of Fig. 1 illustrating another construction of the improved apparatus.

The parts illustrated are adapted to be arranged as heretofore customary within a yoke connected to the shank of the coupling head.

Referring to Fig. 1, 1 indicates a casing, 2 the wedge member of the friction draft gear projecting from the rear end of said casing. The shoes 3 of the friction draft gear bear upon a follower head 4 formed in one with a compression plate 5 that is normally seated on a shoulder 6 of the casing 1.

7 indicates an india-rubber spring arranged within the casing 1 between the compression plate 5 and an intermedite abutment plate 8 arranged to slide in the casing 1. In front of the intermediate abutment plate 8 is a further compression plate 9 for a second india-rubber spring 10 located between it and the closed end 11 of the casing.

The india-rubber springs 7 and 10 are of the well known type comprising a column of units each unit consisting of a number of concentric rings of india-rubber moulded on to a metal plate and projecting from both sides thereof, the india-rubber rings at one side of the said metal plate being connected to the india-rubber rings at the other side thereof by india-rubber that extends through perforations formed in the metal plate. Between the several units of each spring column metal dividing plates 12 are arranged.

A bolt 13 that holds the wedge 2 of the gear in position is formed with an axial extension 14 that enters the central hole of the spring 7. The compression plate 9 is formed with a central boss 15 that enters a central hole formed in the intermediate abutment plate 8. The end 11 of the casing is formed with a central boss 16 that enters the central hole of the spring 10 to assist in positioning the same. A sleeve 17ª surrounding the spring 10 is formed in one with the intermediate abutment plate 8 which in the example shown is also provided with a rearwardly extending sleeve 17 that surrounds the spring 7 but this sleeve 17 is not essential.

The arrangement is such that upon either buffing or drawing the springs 7 and 10 are compressed in series until the sleeve 17 abuts against the end 11 of the casing. Continued movement then results in compression of the spring 7 alone until the bolt extension 14 abuts against the boss 15 of the compression plate 9 after which both springs 7 and 10 are compressed in parallel. The friction draft gear functions simultaneously with the compression of the springs.

Fig. 2 shows an arrangement of three india-rubber springs arranged to function first in series and then in parallel.

In this construction the spring 10 is arranged to bear against a second sliding abutment plate 18 and the third india-rubber spring 19 is arranged between a second compression plate 20 and the end 11 of the casing. The compression plate 20 is formed with a boss 21 that enters an axial hole in the sliding abutment plate 18 and the compression plate 9 is formed with an axial pin 22 on which the spring 10 is mounted. The sliding abutment plate 18 is formed in one with a sleeve 23 that surrounds the india-rubber spring 20.

The arrangement is such that in either buffing or drawing the three springs 7, 10 and 20 are compressed in series until the sleeve 23 abuts against the end 11 of the casing; simultaneously the axial pin 22 of the compression plate 9 strikes the boss 21 of the compression plate 20; the springs 7 and 10 are then compressed in series and the spring 20 in parallel therewith until the sleeve 17 bears against the abutment plate 18; continued movement then results in the spring 7 being further compressed alone until the pin 14 strikes the boss 15 of the abutment plate 9 after which further movement results in all the three springs being compressed in parallel.

It will be appreciated that an arrangement embodying the invention is such that it can be fitted readily within the coupling head yoke in place of usual friction draft gear.

What we claim is:—

1. In central buffing and draw gear, a casing adapted to be embraced by the yoke of the coupling head shank, wedge shoes mounted in one end of said casing, a wedge member co-operating with said shoes and projecting from said casing, a follower plate within said casing on which said wedge shoes bear, an axial pin projecting from said follower plate, an india-rubber spring against which said follower plate bears mounted on said axial pin, an abutment plate for said spring mounted to slide within said casing and formed with an axial hole in line with said axial pin, a sleeve extending from said sliding abutment plate, a second india-rubber spring surrounded by said sleeve, and a compression plate between which and the closed end of the said casing the said second spring is arranged.

2. In central buffing and draw gear, a casing adapted to be embraced by the yoke of the coupling head shank, wedge shoes mounted in one end of said casing, a wedge member co-operating with said shoes and projecting from said casing, a follower plate within said casing on which said wedge shoes bear, an axial pin projecting from said follower plate, an india-rubber spring against which said follower plate bears mounted on said axial pin, an abutment plate for said spring mounted to slide within said casing and formed with an axial hole in line with said axial pin, a sleeve extending from said sliding abutment plate, a second india-rubber spring surrounded by said sleeve, a compression plate for said second spring, an axial pin projecting from said last-mentioned compression plate on which said second spring is mounted, an abutment plate for said second spring mounted to slide in said casing and formed with an axial hole in line with the said axial pin of the said compression plate of the said second spring, a sleeve extending from said last-mentioned sliding abutment plate, a third india-rubber spring surrounded by said last-mentioned sleeve, and a compression plate between which and the closed end of the said casing the said third india-rubber spring is arranged.

3. Central buffing and draw gear comprising a casing adapted to be embraced by the yoke of the coupling head shank, friction draw gear elements carried by said casing, india-rubber springs arranged tandemwise within said casing, a rearward extension secured to certain of the friction draw gear elements projecting centrally within one of said india-rubber springs operative to compress the second spring when moving inwardly as a result of buff or draft strains.

4. Central buffing and draw gear comprising a casing adapted to be embraced by the yoke of the coupling head shank, friction draw gear elements carried by said casing, india-rubber springs arranged tandemwise within said casing, a sleeve surrounding said springs and slidable within said casing, an abutment plate extending inwardly from said sleeve to engage the first spring, a second abutment plate engaging the second spring, a rearward extension to certain of said friction draw gear elements projecting centrally of said first spring and engaging said second abutment plate to effect compression of said second spring in parallel with the first spring when accommodating buff or draft strains.

5. Central buffing and draw gear comprising a casing adapted to be embraced by the yoke of the coupling head shank, friction draw gear elements carried by said casing, india-rubber springs arranged tandemwise within said casing, a bolt secured to certain of the friction draw gear elements, a movable abutment for one of said springs mounted on said bolt, a rearward extension to said bolt, a sleeve surrounding said springs and slidable within said casing, an abutment plate extending inwardly from said sleeve to engage said first spring, and a second movable abutment plate operative to compress said second spring, the arrangement being such that the springs are initially compressed in series owing to movement of said sleeve, the final compression being effected in parallel owing to abutment between such bolt extension and said second abutment plate.

6. Central buffing and draw gear comprising a casing adapted to be embraced by the yoke of the coupling head shank, friction draw gear elements carried by said casing, a plurality of india-rubber springs arranged tandemwise within said casing, each india-rubber spring including a series of units consisting of concentric rings of india-rubber moulded on to both sides of a metal plate, the several units being separated by metal plates, an abutment plate to certain of said friction draw gear elements effecting compression of one of said springs simultaneously with the operation of the friction gear elements and a rearward extension from said abutment plate operative to effect compression of the second spring under intense buffing or draw stress.

In testimony whereof we affix our signatures.

RICHARD THOMSON GLASCODINE.
REGINALD LAWRENCE WHITMORE.